J. DICK, Jr.
2 Sheets—Sheet 1.
Harvester.
No. 3,127.
Reissued Sept. 22, 1868.
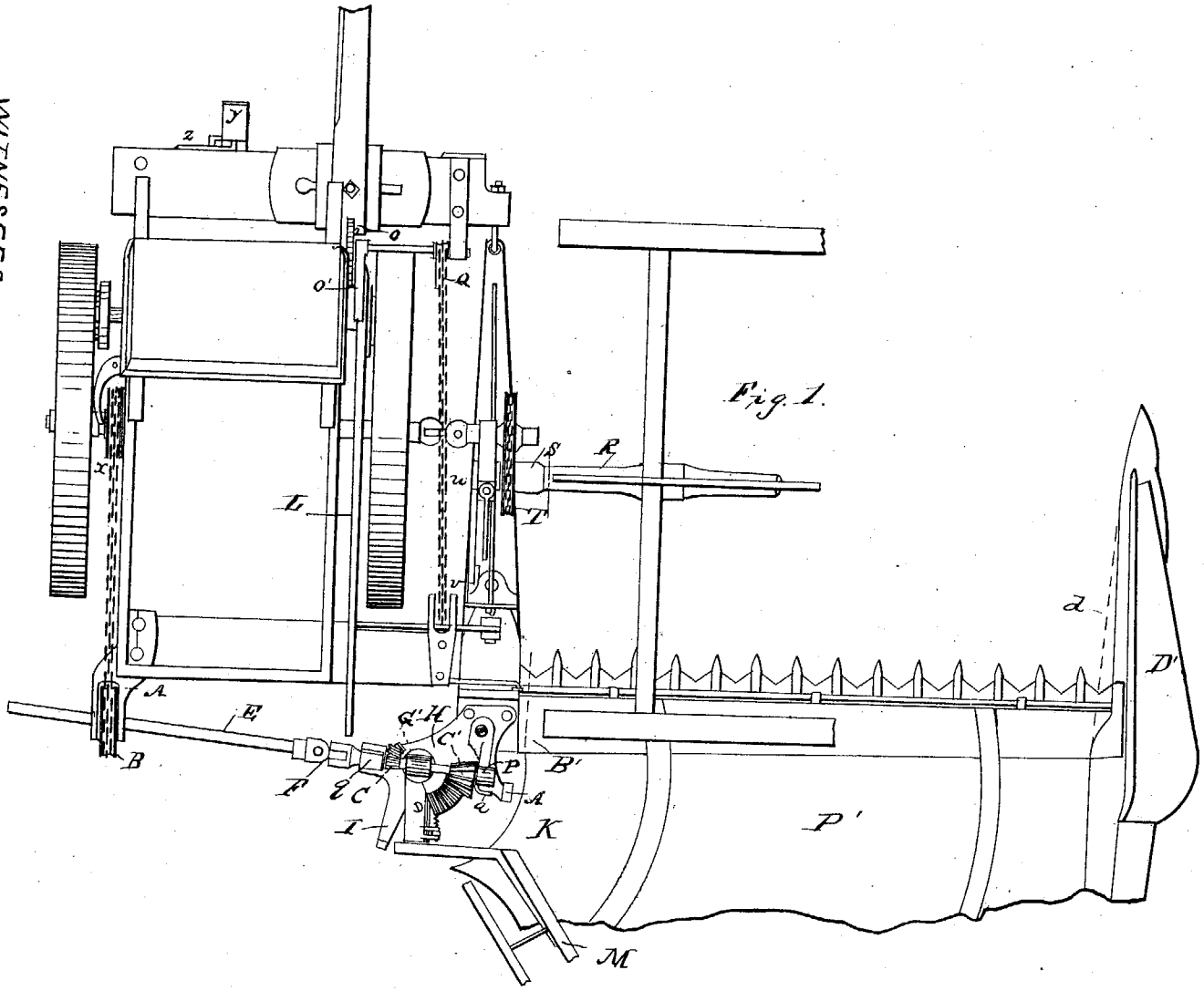
WITNESSES
Edw. S. Coye
Jas Loughborough
INVENTOR.
J. Dick Jr. By his Atty
Wm Loughborough
N. PETERS, Photo-Lithographer, Washington, D. C.

J. DICK, Jr.
Harvester.
No. 3,127.
Reissued Sept. 22, 1868.
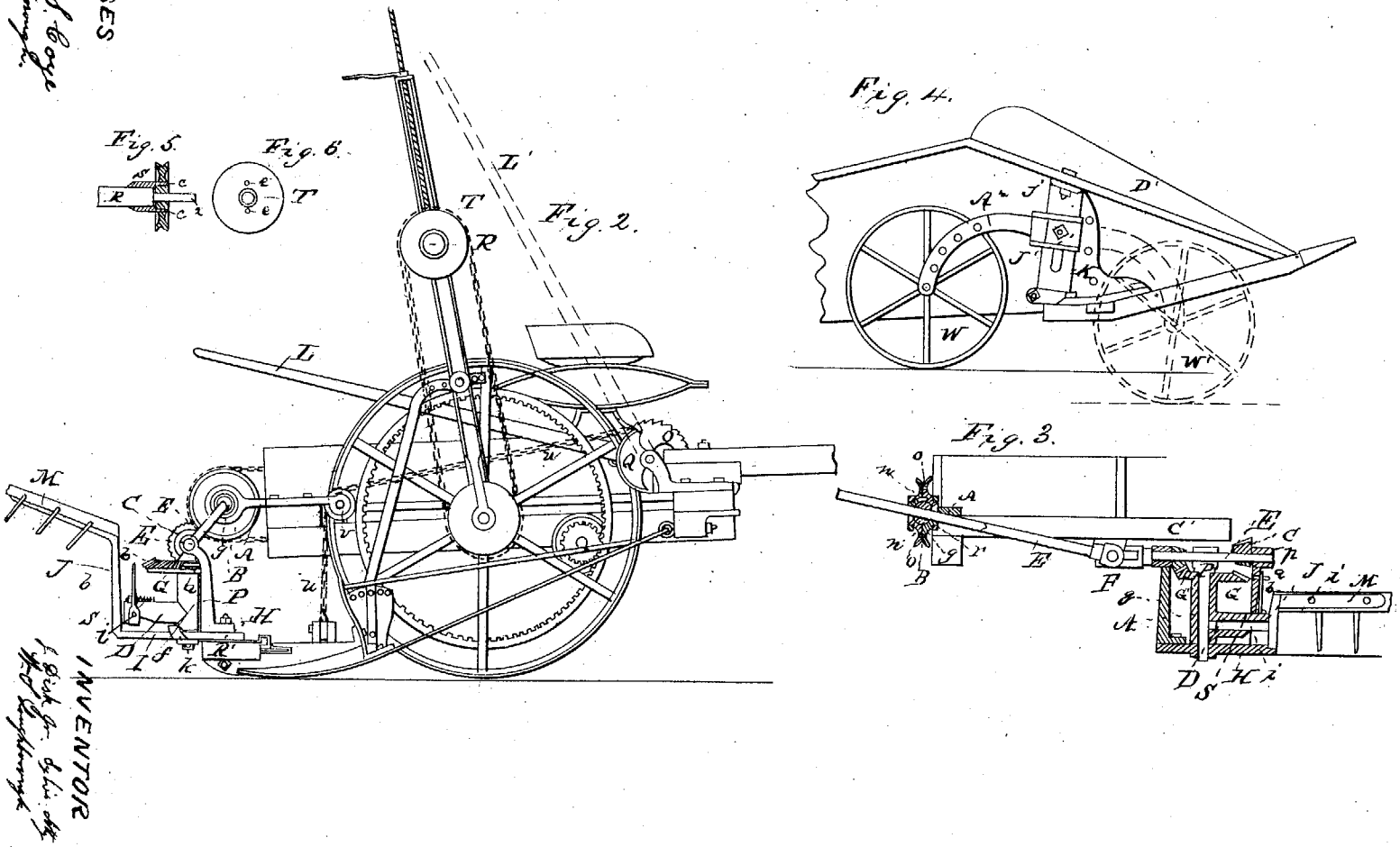
WITNESSES
Edwin S. Coye
Geo. Loughborough.
INVENTOR
J. Dick Jr. by his Atty
H. S. Loughborough
N. PETERS, Photo-Lithographer, Washington, D. C.

UNITED STATES PATENT OFFICE.

JOSEPH DICK, JR., OF OSHAWA COUNTY, ONTARIO, CANADA, AND EUGENE GLEN, OF ROCHESTER, NEW YORK, ASSIGNEES, BY MESNE ASSIGNMENTS, OF JOSEPH DICK, JR.

IMPROVEMENT IN HARVESTER-RAKES.

Specification forming part of Letters Patent No. 58,617, dated October 9, 1866; Reissue No. 3,127, dated September 22, 1868.

*To all whom it may concern:*

Be it known that JOSEPH DICK, Jr., formerly of Canton, in the county of Stark and State of Ohio, but now residing in Oshawa county, and Province of Ontario, invented certain new and useful Improvements in Self-Raking Reapers, of which the following is a full, clear, and exact description, reference being had to the accompanying drawings, making part of this specification, in which—

Figure 1 is a plan or top view of the main frame, &c., of the Ball machine, excepting a portion of the platform P′ and of the rake-head M, and of the reel with said invention attached. Fig. 2 is a right-hand-side elevation of the same, the platform and reel being removed. Fig. 3 is a rear elevation of the frame of the machine, showing the relative arrangement and manner of connecting thereto the rake attachment, the ball-joint, reciprocating post *f*, with its arm D, and pinions C C′ being shown in vertical section. Fig. 4 is a right-hand-side elevation of the divider-board D′ and wheel W, showing the inclined axis of the caster-arm A′. Fig. 5 is a transverse section of the pulley T and sleeve S. Fig. 6 is a detached view of the pulley T.

Similar letters indicate corresponding parts in all the figures.

The nature of this invention will be understood by reference to the drawings and specification.

The main portions of the Ball machine are used without reconstruction, though the invention can be applied equally well to many others.

The stock H, upon which the supports of the rake are fixed, is bolted to the cutter-bar R′. To this plate are bolted two standards, *p* and *q*, in the top of which is hung the segmental pinion-shaft E′. This shaft has also a bearing in the top of the axial post P. The vertical sleeve *f* is sustained by this post, which constitutes its axis. The sleeve is provided at the top with two segments of beveled gearing, G G′, of unequal diameter. It is also provided with a hollow arm, D, near its lower end, to receive the journal *i′* of the shank J of the rake-head M. The journal is secured to the arm by the bolt *i*, which is inserted through an opening made in the under side of the arm, and far enough from the end to give the necessary strength to that portion of the arm remaining outside of the pin when inserted. This pin *i* also serves to hold the rake-head in its upper position while making its forward stroke. There is a spring-locking latch or catch, *b*, pivoted to the arm D, as shown in Figs. 1, 2, and 3. This latch is provided with a hook or an opening, in which the pin *i* enters when the rake-head is raised, as shown in Fig. 2.

The pinions C and C′ are prevented from getting out of gear with G and G′ by means of the high tooth (shown at *h*, Fig. 2) on the rear edge of both segments. The toothed sections of the pinions C and C′ should be so graduated with relation to each other and to the toothed wings G and G′ that when one pinion is just going out of gear with its wings the other shall be entering—that is, both pinions shall never be entirely out of gear with the wings G and G′ at the same time. These pinions may be made of equal diameter, even when placed at unequal distances from the axial post P, in which case the toothed segments G and G′ may be made on the same plane instead of one being elevated above the other, as in the present case. If the pinions C and C′ are placed equidistant from the post P, their toothed sections should be equal.

It is desirable to give the rake a more rapid movement forward than when laboring or delivering the bundles. This is accomplished by reducing the diameter of segment G′, which produces the return stroke of the rake.

The shaft E is coupled to the shaft E′ by an ordinary universal or toggle joint, F. Shaft E is square at the upper end, and is fitted through a corresponding-shaped mortise in the ball *g*. This ball is fitted in a spherical cavity formed within the hub of the pulley B, said hub being enlarged for the purpose. The pulley B is composed of two parts, which are secured together by screws or rivets *n*, as shown in Figs. 2 and 3. The hub projects on each side of the pulley, forming a cylindrical bearing in the yoke A, which is also composed of two parts, that are bolted to the machine, as shown in Fig. 1. The ball *g* is provided with a spur or pin, *r*, that takes in a lateral slot, *o*, formed in the pulley B, Fig. 3, for this purpose, the slot allowing the ball to accommodate its position to that required by the ever-changing direction of the shaft E, and that being fitted to slide through the ball permits the ordinary self-raker to be used upon those machines having jointed cutter-bars.

Pulley B may be driven by a chain from the pulley X, hung loosely upon the ground-wheel shaft of the machine. This pulley is driven, when desired, by an ordinary sliding clutch, feathered to the shaft, and operated by the driver by pressing the foot-plate or spring Y forward, in which position it may be retained by dropping the latch *z* between it and the frame. The pulley X is thereby held out of gear.

The plan for raising the cutter-bar on the Ball machine is inconvenient for the driver to manipulate, and the elevating-lever L is therefore arranged in a more accessible position than heretofore used on this machine. Said lever is hinged to the front of the frame, so as to swing down between the inside driving-wheel and the end of the seat, and is held in any required position to afford the desired elevation of the cutter-bar, &c., by means of the ratchet O and pawl O′. The raising-chain U passes over the pulley V and forward between the ground-wheel and the reel-post, and is connected to the head or cam Q of the lever-shaft.

It is often desirable to change the pulley T on the reel-shaft for a larger or smaller one, so as to change the relative speed of the reel, and in order to facilitate the making of these changes, and to relieve the journal-pin *x* from the strain of driving the reel as heretofore made, I make the sleeve S with one or more projecting spurs or pins, *c*, which shall register to the opening *e*, whereby the pulley is effectually locked to the shaft when the parts are adjusted in the machine, and yet is easily applied or removed, and the pins drive the reel without twisting the journal-pin *x* in the shaft R.

The pinions C and C′ are driven in the direction indicated by the arrow in Fig. 2 by shaft E, always revolving in the same direction, and they gear alternately into the toothed wings G and G′, thereby producing the reciprocating movement of the rake. As it is thrown back with a bundle, and at the instant of delivering it, the lower end of arm J strikes the cam I, which swings the rake up into the position shown in Fig. 2, where it is caught and held by the spring locking-latch *b* until the rake is swung forward again, when the tappet *a* presses the top of the spring-latch *b* back, so as to unhook the pin *i*, and the rake again drops or is forced to the position shown in Fig. 3 by the lower end of the shank J striking the cam K.

The shaft E may be made of round iron, feathered through the ball *g*, or of any other shape that will not permit a revolution of the shaft independent of the ball; or it may be grooved, and a pin inserted in the ball to work in the grooves; but the square shaft, as shown, is preferred. The opening through the ball should correspond with the shape of the shaft passing through it.

What is claimed as the invention of the said DICK, and sought to be secured by Letters Patent, is—

1. The joint-ball *g*, working within the pulley or case B, both constructed and operating with reference to each other, substantially as shown and described, for the purpose of communicating power to and in combination with an automatic rake for harvesters.

2. The hanger A, the pulley or case B, and the joint-ball *g*, all constructed and operating with reference to each other, substantially as shown and described, for the purpose of communicating power to and in combination with an automatic rake for harvesters.

3. The employment of a continuously-rotating extensible or sliding tumbling-shaft, in combination with a vibrating sweep-rake for operating the same, substantially as described.

4. The arrangement of the segments G and G′ upon the vertical sleeve *f*, and the segmental pinions C and C′ upon the horizontal driving-shaft E of the raker, as shown, so as to constitute collectively an entire circle of gearing, as shown and described.

5. The combination of the detachable pulley T with the sleeve or ferrule S, having one or more locking-pins, *c*, substantially as and for the purpose set forth.

6. The arrangement of the elevating-lever L, ratchet O′, head Q, chain U, and pulley V, in combination with each other and the brace of the shoe, as and for the purpose set forth.

JOSEPH DICK, JR.
EUGENE GLEN.

Witnesses to signature of Joseph Dick, Jr.:
F. W. GLEN,
LYMAN ENGLISH.

Witnesses to signature of Eugene Glen:
MILTON E. HOLTON,
WILLIAM L. ANGEVINE.